April 7, 1953  N. G. LINDSTRÖM  2,633,749
CALORIMETER FOR HEAT EXCHANGE FLUIDS
Filed Feb. 6, 1950  2 SHEETS—SHEET 1

Inventor
N. G. Lindström

Patented Apr. 7, 1953

2,633,749

UNITED STATES PATENT OFFICE 2,633,749

CALORIMETER FOR HEAT EXCHANGE FLUIDS

Nils Gottfrid Lindström, Stockholm, Sweden, assignor to Telefonaktiebolaget L M Ericsson, Stockholm, Sweden, a company of Sweden Application February 6, 1950, Serial No. 142,653
In Sweden February 25, 1949

3 Claims. (Cl. 73—193)

The present invention relates to a device for measuring quantities of heat conveyed by a circulating heat transporting medium through a heating plant or a cooling plant. A calorimeter of an extremely simple and reliable construction having no movable parts whatever is obtained by this invention. The calorimeter is based on the well-known fact that the heat transition constant between a flowing medium and a solid body which is washed by the medium varies with the velocity of the medium.

Calorimeters according to the invention consist partly of two channels, of which one is intended to be an integral part of an inlet line and the second a part of an outlet line for a heat transporting medium flowing through a heat absorbing or heat emitting device, and partly of two heat conducting bodies partially inserted in said channels by means of heat insulating inlets in the walls of the channels and producing each a heat exchange between the medium of the one channel and the medium of the second channel. Those parts of the one body, which are inserted in said channels, are enclosed in envelopes of heat conducting material, said envelopes being filled with a stagnant medium. A thermoelement is arranged in each of said bodies and emits a voltage proportional to the difference of temperature between two points in the body, which thermoelements are connected in series opposition with each other, the resulting voltage being connected to an electric measuring device.

The invention will be described more closely with reference to the annexed drawings, in which Fig. 1 shows a measuring device according to the invention provided with an auxiliary thermoelement 17—18 for adjusting purposes.

Figure 1:
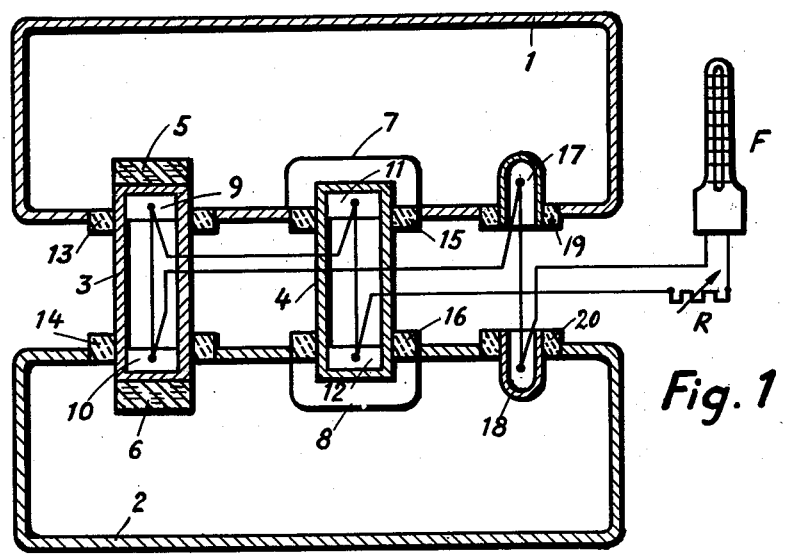
Figure 2:
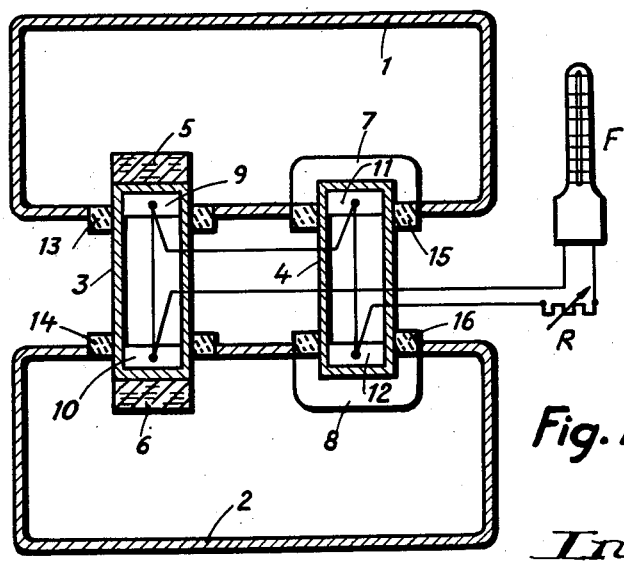
Fig. 2 shows the same measuring device without said auxiliary thermoelement.

In Figs. 1 and 2, two channels 1 and 2 are shown in section, through which the heat transporting medium is flowing. One channel is an integral part of the inlet line and the second a part of the outlet line of a heat absorbing or heat emitting device. Between the two channels there are two heat conducting bodies 3 and 4, which are heat insulated from the walls of the channels by means of insulating collars or the like forming inlets 13, 14, 15 and 16 and which produce a heat exchange between the medium of the one channel and the medium of the second channel. This heat exchange is of course inconsiderable compared with the heat exchange in the heat absorbing or heat emitting device, the heat exchange of which the measuring device is to measure. The heat conducting bodies 3 and 4 are hollow and contain each a thermoelement consisting of two groups of soldered junctions 9 and 10 and 11 and 12, respectively. The soldered junctions are grouted with litharge cement or some other electrically non-conducting material of good heat conducting capacity, due to which a good heat conducting communication is obtained between the soldering points and the heat conducting bodies 3 and 4.

Those parts of the heat conducting body 3, which are inserted in the channels, have the shape of a short circular cylinder, which has proved to give a substantially linear relation between the heat exchange to be measured and the electromotive force from the thermoelement of the measuring device. The conducting surfaces between the medium and the conduit 3 must lie adjacent the wall of the channel where the medium is flowing slowly and smoothly. The desired linearity is also obtained by reason of the fact that the plane surfaces of the cylinder are covered with cork discs 5 and 6. Those parts of the heat conducting body 4, which are inserted in the channels, are enclosed in envelopes 7 and 8, respectively, of heat conducting material. The envelopes are filled with a stationary part of the same medium as is flowing in the channels 1 and 2. The envelopes are of metal and have much greater surface area than said short circular cylinders, and the fall of temperature in the envelopes is therefore insignificant.

The two thermoelements 9—10 and 11—12 in Fig. 2 are connected in such a way that they tend to counteract each other and the resulting voltage is connected to an electrolytic meter F over a regulating resistance R so adjusted, that each scale line on the electrolytic meter corresponds to a certain absorbed or emitted quantity of heat. Through the electrolytic meter an electric current is then obtained, which varies partly with the difference of temperature between the medium of the inlet channel and the medium in the outlet channel, and partly with the velocity of the medium in the channels. The channels are identically alike and the same quantity of medium passes through both channels, for which reason the velocity of the medium always is the same in the two channels. If at a certain difference of temperature between the medium of the two channels, the velocity of the medium grows very great, the electromotive force from the thermoelements will approach a limit, the value of which is proportional to said difference of temperature.

In calorimeters based on the varying of the heat transition constant as described in my prior application Serial No. 726,606, filed February 5, 1947, and entitled "Device for Measuring Speeds and Heat Quantities in Running Media," the delivered electromotive force is brought to nought, when the medium is not moving, with the help of a thermocouple corresponding to 17, 18 in Fig. 1. This thermo-couple however delivers the same electromotive force independent of the absolute temperature of the medium; that is, if the temperature of the medium in channel 1 is 80° C. and in channel 2 is 60° C., the electromotive force delivered from the thermo-couple 17, 18 is the same as when the temperature in channel 1 is 40° and in channel 2 is 20° C. However, the heat transition constant varies not only with the velocity of the medium but also with the absolute temperature. Therefore, the correction to nought must be made with such an arrangement that the correcting electromotive force follows the variation of the heat transition constant. This is obtained according to the present invention with the help of a second heat conducting body 4 part of which is in contact with the medium in a chamber 7 or 8 in which the medium is stationary, or of zero velocity. The thermo-couple 17, 18 alone can be used for small corrections where no greater accuracy is necessary.

Figure 3:
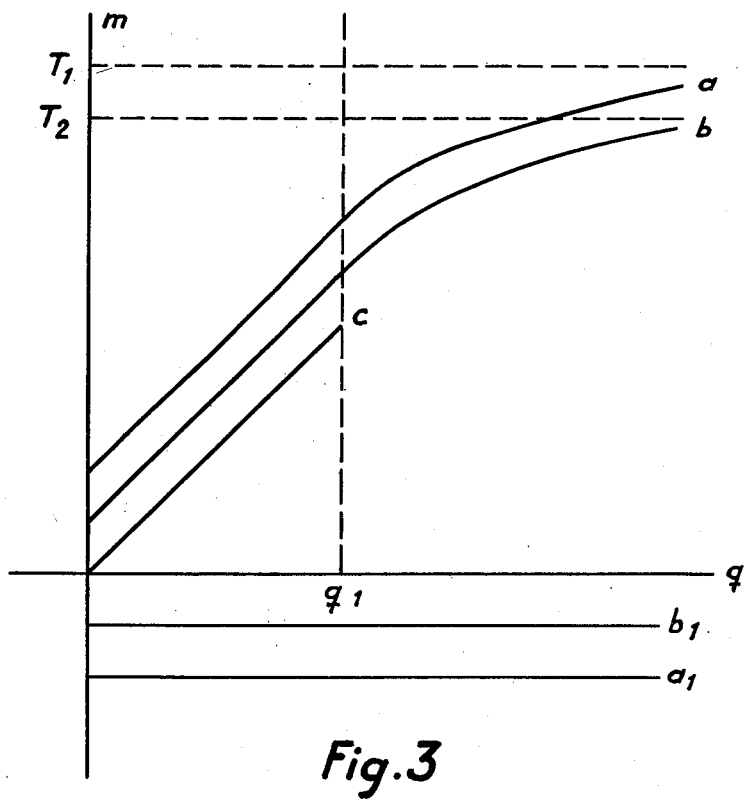
Fig. 3 shows curves of the relation between the electromotive force, which is obtained from the thermoelements and that quantity of heat which has been absorbed or emitted in the heat absorbing or heat emitting device at two different values of the difference of temperature between the medium of the inlet channel and the medium of the outlet channel.

The curves $a$ and $b$ in Fig. 3 show the relation between the heat exchange $q$ in a heat absorbing or heat emitting device traversed by the heat transporting medium, and that electromotive force, which is obtained from the thermoelement 9—10 in the calorimeter according to Fig. 1 or 2 at two different values of the difference of temperature between the medium of the inlet channel and the medium of the outlet channel. The electromotive force $m$ varies with the product of the velocity of the medium and the difference of temperature of the medium in channel 1 and the medium in channel 2, that is, with said heat exchange $q$ as described in said prior application. In Fig. 3 T1 and T2 indicate those limits for the electromotive force $m$ which are attained at a very high velocity in the medium for the two values of the difference of temperature. As is evident the curves are running parallel with each other and are, within the range $q=0$ to $q=q_1$ mainly straight lines. The reason why the same curve is not obtained independent of the difference of temperature is partly due to the fact, that the heat transition constant between the medium and a solid body varies with the absolute value of the temperature, and partly to the fact that when the medium is not moving the heat exchange will be nought, the electromotive power from the thermoelement however being proportional to the difference of temperature between the medium of the inlet channel and the medium of the outlet channel. To compensate this variation of the meter, the heat conducting body 4 has been introduced. The surfaces of contact between the body 4 and the medium have been enclosed in said envelopes 7 and 8, due to which they always will be disposed in a stagnant medium. The thermoelement 11—12 is so placed and arranged that its electromotive power $a_1$ and $b_1$, respectively, in Fig. 3 counterbalances the electromotive power from the thermoelement 9—10 when the medium in the channels is not moving. As the heat transition constant between the medium and the two heat conducting bodies 3 and 4 changes equally as much for each variation of temperature in the medium, the meter will always indicate $q=0$ when the medium is not moving. In Fig. 3 the curves $a$ and $a_1$ correspond to the electromotive forces from the thermoelements 9—10 and 11—12, respectively, at a certain temperature in the medium and the curves $b$ and $b_1$ to the same electromotive forces at another temperature. The resulting electromotive force from the meter gives in both cases the curve $c$, which may be supposed to be substantially linear between the values: $q=0$, and $q=q_1$. The curve C consequently represents the relation between the electromotive force $m$ delivered from the calorimeter and the heat exchange $q$ in the said heat absorbing or heat emitting device. The curves $a_1$ and $b_1$ are here looked upon as independent of the velocity of the medium.

In practice there will always arise a small difference of temperature between the flowing medium and the stagnant medium in the envelopes 7 and 8. To have the meter indicate exactly nought, when the medium in the channels is not moving, a third thermoelement 17—18 in Fig. 1 has been introduced. The soldered junctions 17 and 18 are situated in copper sleeves filled with litharge cement, are insulated from the walls of the channels by means of insulating collars forming inlets 19—20, and are washed by the medium in the channels, so that they will assume the temperature of the medium. The electromotive force from the thermoelement 17—18 increases proportional to the difference of temperature between the medium in the channel 1 and the medium in the channel 2. As a difference of temperature between the flowing medium and the stagnant medium in the envelopes 7 and 8 arises because of heat transport through the shunt 4 between the medium in channel 1 and the medium in channel 2, the thermoelement 17—18 may be so arranged, that its electromotive force can be used for compensating the difference of temperature between the flowing and the stagnant medium. The electromotive force from the thermoelement 17—18 counteracts the resulting electromotive force from the thermoelements 9—10 and 11—12, and abolishes that variation which arises because of the difference of temperature between the flowing medium in the channels and the medium in the envelopes 7—8.

I claim:

1. A calorimeter comprising a first channel and a second channel of which one is an integral part of an inlet line and the other is a part of an outlet line for a heat transporting medium flowing through a heat absorbing or emitting device, two heat conducting conduits, said conduits having their extremities extending through the walls of said respective channels and in thermal contact with the medium flowing through said channels, but insulated from said walls, heat-transmitting means defining a chamber about each end of one of said conduits where it extends through said walls, each of said chambers containing a stationary portion of the same medium as flows through said channels, a thermocouple in each of said conduits having one junction adjacent the first channel and the other junction adjacent the second channel, circuit means connecting said thermocouples in series opposition, and means for measuring the resultant electromotive force of said thermocouples.

2. A calorimeter in accordance with claim 1, and a third thermocouple having one of its junctions in the medium in one of said channels and its other junction in the medium in the other of said channels to produce an electromotive force proportional to the difference in temperature between the medium in said two channels, means connecting said third thermocouple in series with the first two thermocouples, said third thermocouple being constructed and arranged to produce zero electrical output when the medium in said channels is at rest.

3. A calorimeter in accordance with claim 1, in which the junctions of at least one of said thermocouples is grouted with an electrically insulating material having good heat conducting capacity.

NILS GOTTFRID LINDSTRÖM.

REFERENCES CITED

The following references are of record in the file of this patent:

UNITED STATES PATENTS

| Number | Name | Date |
|---|---|---|
| 1,640,801 | Petersen | Aug. 30, 1927 |

FOREIGN PATENTS

| Number | Country | Date |
|---|---|---|
| 789,342 | France | Aug. 19, 1935 |